US010251059B2

(12) United States Patent
Wentz et al.

(10) Patent No.: US 10,251,059 B2
(45) Date of Patent: Apr. 2, 2019

(54) AUTHENTICATION DEVICE AND METHOD

(71) Applicant: EveryKey, LLC, Cleveland, OH (US)

(72) Inventors: Christopher Wentz, Longmont, CO (US); Xiqian Qian, Beijing (CN); Ruslan Berezyuk, Buenos Aires (AR)

(73) Assignee: EVERYKEY INC., Lakewood, OH (US)

( * ) Notice: Subject to any disclaimer, the term of this patent is extended or adjusted under 35 U.S.C. 154(b) by 47 days.

(21) Appl. No.: 14/333,598

(22) Filed: Jul. 17, 2014

(65) Prior Publication Data

US 2015/0207795 A1 Jul. 23, 2015

Related U.S. Application Data

(60) Provisional application No. 61/929,845, filed on Jan. 21, 2014.

(51) Int. Cl.
*H04L 9/12* (2006.01)
*H04L 9/32* (2006.01)
(Continued)

(52) U.S. Cl.
CPC ............ *H04W 12/08* (2013.01); *G06F 21/34* (2013.01); *G06F 21/44* (2013.01); *H04L 9/12* (2013.01);
(Continued)

(58) Field of Classification Search
CPC . H04L 9/00; H04L 9/08; H04L 9/0816; H04L 9/0819; H04L 9/0838; H04L 9/0861; H04L 9/0863; H04L 9/0866; H04L 9/0869; H04L 9/12; H04L 9/14; H04L 9/16; H04L 9/32; H04L 9/3271; H04L 2209/00; H04L 2209/80; H04L 2209/805; H04L 9/3226;
(Continued)

(56) References Cited

U.S. PATENT DOCUMENTS 6,416,471 B1 7/2002 Kumar et al.
7,594,114 B2 9/2009 Hooker et al.
(Continued)

OTHER PUBLICATIONS

International Searching Authority, The International Search Report and the Written Opinion of the International Search Authority dated Apr. 28, 2015, International Application No. PCT/US15/12032, International Filing Date Jan. 20, 2015.
(Continued)

*Primary Examiner* — Shanto Abedin
*Assistant Examiner* — Adrian Stoica
(74) *Attorney, Agent, or Firm* — Tarolli, Sundheim, Covell & Tummino LLP

(57) ABSTRACT

An authentication device includes at least one processor, at least one computer-readable medium, and program instructions stored on the at least one computer-readable medium for execution by the at least one processor. The program instructions include first program instructions to wirelessly pair the authentication device with a controlled access device. The program instructions further include second program instructions to broadcast data indicative of an authorization to grant access to the controlled access device, while the controlled access device is within a predefined range of the authentication device, upon successfully pairing with the controlled access device.

15 Claims, 5 Drawing Sheets

(51) Int. Cl.
*G06F 21/34* (2013.01)
*G06F 21/44* (2013.01)
*H04W 12/08* (2009.01)

(52) U.S. Cl.
CPC ...... *H04L 9/3271* (2013.01); *H04L 2209/805* (2013.01)

(58) Field of Classification Search
CPC ... H04L 9/3234; H04L 63/04; H04L 63/0428; H04L 63/0492; H04L 63/08; H04L 63/10; H04W 12/00; H04W 12/04; H04W 12/06; H04W 12/08; G06F 21/00; G06F 21/30; G06F 21/44; G06F 21/445; G06F 21/34; G06F 21/35
See application file for complete search history.

(56) References Cited

U.S. PATENT DOCUMENTS

| | | | |
|---|---|---|---|
| 7,741,969 B2 | 6/2010 | Linford | |
| 7,843,312 B2 | 11/2010 | Eskildsen et al. | |
| 7,961,076 B2 | 6/2011 | Kelley et al. | |
| 8,070,061 B2 | 12/2011 | Habraken | |
| 8,160,548 B2 | 4/2012 | Aaron | |
| 8,264,322 B2 | 9/2012 | Rodenbeck et al. | |
| 8,425,314 B2 | 4/2013 | Benbrahim | |
| 8,430,310 B1 | 4/2013 | Ho et al. | |
| 8,683,550 B2 | 3/2014 | Hung | |
| 8,933,778 B2 | 1/2015 | Birkel et al. | |
| 2003/0163739 A1 | 8/2003 | Armington et al. | |
| 2004/0064699 A1 | 4/2004 | Hooker et al. | |
| 2004/0128509 A1* | 7/2004 | Gehrmann | H04L 63/062 713/171 |
| 2006/0059367 A1* | 3/2006 | Yarvis | G07C 9/00111 713/189 |
| 2006/0250215 A1 | 11/2006 | Norton et al. | |
| 2007/0159301 A1 | 7/2007 | Hirt et al. | |
| 2007/0192599 A1 | 8/2007 | Kato et al. | |
| 2007/0200671 A1 | 8/2007 | Kelley et al. | |
| 2008/0134281 A1* | 6/2008 | Shinde | G06F 21/31 726/1 |
| 2011/0231914 A1 | 9/2011 | Hung | |
| 2011/0238995 A1* | 9/2011 | Blanco | H04L 63/0492 713/173 |
| 2011/0300928 A1 | 12/2011 | Benbrahim | |
| 2012/0054493 A1* | 3/2012 | Bradley | H04W 8/005 713/171 |
| 2014/0025951 A1 | 1/2014 | Ho et al. | |
| 2014/0077929 A1* | 3/2014 | Dumas | G07C 9/00571 340/5.61 |
| 2014/0133656 A1* | 5/2014 | Wurster | H04L 9/0637 380/270 |
| 2014/0139315 A1* | 5/2014 | Keranen | H04L 63/0492 340/5.51 |
| 2014/0240087 A1 | 8/2014 | Liu et al. | |
| 2014/0292481 A1 | 10/2014 | Dumas et al. | |
| 2014/0370807 A1* | 12/2014 | Lei | G06K 9/00496 455/41.2 |
| 2015/0048927 A1 | 2/2015 | Simmons | |

OTHER PUBLICATIONS

"Lockitron." Lockitron. Apr. 6, 2015. https://lockitron.com.
"EK6 Bluetooth Proximity Readers—ECKey Smartphone Access Control." ECKey. Apr. 20, 2015. http://eckey.com/enterprise-access/. http://eckey.com/wp-content/uploads/EK6-Datasheet.pdf.
"Smart Locks with Smart Keys—OKIDOKEYS." Apr. 20, 2015. https://www.okidokeys.com/.

* cited by examiner

AUTHENTICATION DEVICE AND METHOD

CROSS-REFERENCE TO RELATED APPLICATIONS

This application claims priority from U.S. Patent Application No. 61/929,845 filed on Jan. 21, 2014, which is incorporated by reference herein in its entirety.

FIELD OF INVENTION

The present disclosure relates to the field of access control. More particularly, the present disclosure relates to an authentication device and method for controlling access.

BACKGROUND

Access to computer software, hardware, and other devices, both electrical and mechanical, is commonly controlled using passwords or other types of digital or mechanical keys. A smartphone, for example, may require a passcode or password to be input before it can be unlocked and used to make a call. Similarly, a computer may require a password to be input before it can be used for various computing functions. Software, such as a banking application, may require a password to be input before the application may be used to perform banking tasks. And a door may require a physical key to be inserted before the door can be unlocked and opened.

Remembering passwords and passcodes, however, may be cumbersome and impractical, particularly when a user may be required to keep track of multiple passwords that correspond to gaining access to a variety of software applications, devices, doors, and so on. In addition, storing physical keys for gaining access to a variety of doors, devices, and so on, may be cumbersome and impractical as well.

SUMMARY

An authentication device includes at least one processor, at least one computer-readable medium, and program instructions stored on the at least one computer-readable medium for execution by the at least one processor. The program instructions include first program instructions to wirelessly pair the authentication device with a controlled access device. The program instructions further include second program instructions to broadcast data indicative of an authorization to grant access to the controlled access device, while the controlled access device is within a predefined range of the authentication device, upon successfully pairing with the controlled access device.

In an authentication method, a computing device receives a request to pair with a controlled access device. The computing device wirelessly pairs with a controlled access device. The computing device broadcasts data indicative of an authorization to grant access to the controlled access device, while the controlled access device is within a predefined range of the computing device, upon successfully pairing with the controlled access device.

In a method for granting access to a controlled access device using a key device, a controlled access device communicates a request to pair with a key device. The controlled access device confirms successful pairing with the key device. The controlled access device receives a communication from the key device indicative of an authorization to grant access to the controlled access device. The controlled access device grants access by disabling a lock while the controlled access device continues to receive communications from the key device, at predefined intervals, indicative of an authorization to grant access to the controlled access device.

BRIEF DESCRIPTION OF DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
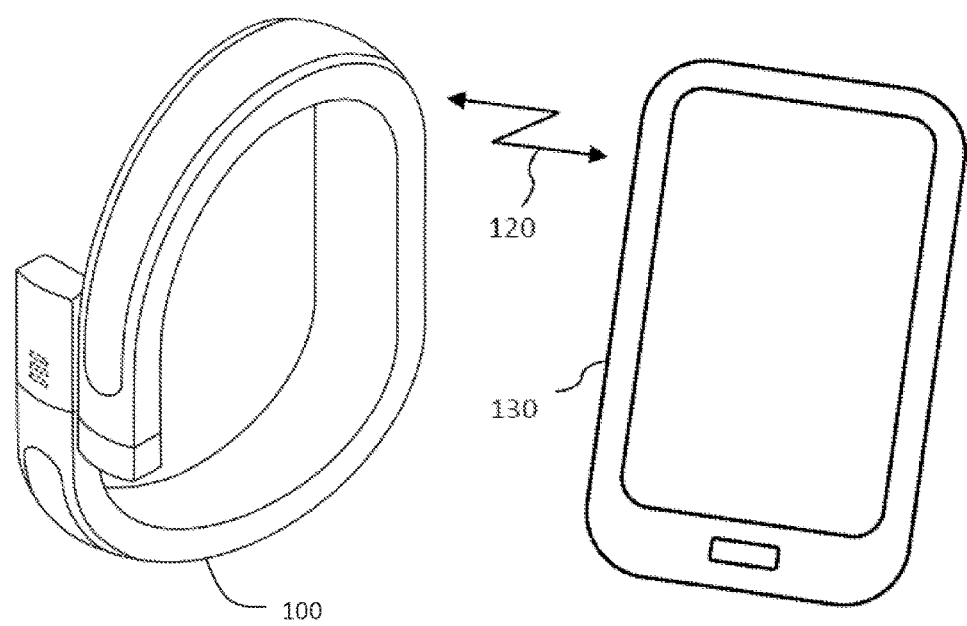
FIG. 1 illustrates a key device and a controlled access device.

A user authentication device and method is disclosed. In one embodiment, a universal access device (henceforth referred to as "key device") is configured to provide access to computer hardware, computer software, and other electrical and mechanical devices that requires a virtual or physical key or password. The key device may include a wireless communications enabled device that the user wears, possesses, or otherwise maintains in physical proximity to allow for access to a suitably configured smartphone, tablet, computer, and devices not normally thought of as having logic such as a door, car door, bike lock, and other controlled access devices. It should be appreciate that controlled access devices such as doors that are not normally thought of as having logic may need to be outfitted with a device including logic in order to communicate with the key device. When the key device is within range of one of the user's controlled access devices, the key device will allow the user to bypass that controlled access device's password or physically unlock it, eliminating the need for complicated passwords and cumbersome keys. When the key device is moved out of range, the controlled access device may re-enable its security mechanisms, so it is safe and secure when out of the user's hands.

In another embodiment, the key device may communicate with controllers in a user environment such as a room in a house, an office, or a vehicle to establish user environmental preferences such as temperature, lighting, music, video and the like. When a user departs the area or after a delay, the controllers may revert to default preferences such as turning off lights and otherwise adjusting environmental controls for energy efficiency.

In operation, the key device and the controlled access device do not require two-way communication and authentication protocols provided that the devices have been initialized and maintain relatively close clock synchronization.

The following description includes definitions of selected terms used throughout the disclosure. Both singular and plural forms of all terms fall within each meaning.

"Address", as used herein, includes but is not limited to one or more network accessible addresses, device identifiers, telephone numbers, IP addresses, URL and ftp locations, e-mail addresses, names, a distribution list including one or more addresses, network drive locations, postal addresses, account numbers or other types of addresses that can identify a desired destination or device.

"Computer-readable medium", as used herein, refers to any medium that participates directly or indirectly in providing instructions and/or data to one or more processors for execution. Such a medium may take many forms, including but not limited to, non-volatile media, and volatile media. Non-volatile media may include, for example, optical or magnetic disks. Volatile media may include, for example, dynamic memory. Common forms of computer-readable media include, for example, a floppy disk, a flexible disk, hard disk, magnetic tape, any other magnetic medium, a CD-ROM, any other optical medium, punch cards, paper-tape, any other physical medium with patterns of holes, a RAM, a PROM, an EPROM, a FLASH-EPROM, any other memory chip or cartridge, or any other medium which can be read by a computer, a processor or other electronic device.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like.

"Signal", as used herein, includes but is not limited to one or more electrical or optical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software components, computers, or other devices capable of using or accessing a component, or combinations of these.

Generally speaking, one embodiment of a system and method as used herein, includes but is not limited to a user associated key device that communicates with and provides access to a controlled access device having some form of access control such as password, key and the like. When in wireless communication and the key device and controlled access device successfully communicate, the controlled access device is at least temporarily accessible without the user having to manually engage with the access control apparatus.

With reference to FIG. 1, an exemplary key device 100 is formed from any suitable material and is shaped to be worn on the wrist of a user (not shown). In other embodiments, the key device 100 may take the form of a wristband, finger ring/toe ring, ear ring/ear stud, necklace, credit card sized wallet insert/purse insert, eyeglasses, epidermal implant, tattoo, other accessory, smartphone, key fob, key chain, sticker, pen, or pencil. The key device 100 communicates 120, preferably via wireless communication such as radio-frequency, infra-red, WiFi, Bluetooth, RFID or Near Field Communication, with a controlled access device 130 such as the smartphone illustrated, and grants access to controlled access device 130. In other embodiments, controlled access devices may alternatively or additionally include, but are not limited to, a tablet device, a laptop computer/desktop computer, house door/apartment door/office door/hotel room door, car door, bike lock, payment terminal, padlock, safe, locking drawer/locking cabinet, firearm, light, television, heating/air conditioning unit, garage door, sink, shower, ATM, music player, printer, public storage rental unit, personal identification system, or controllers for other devices.

Figure 2:
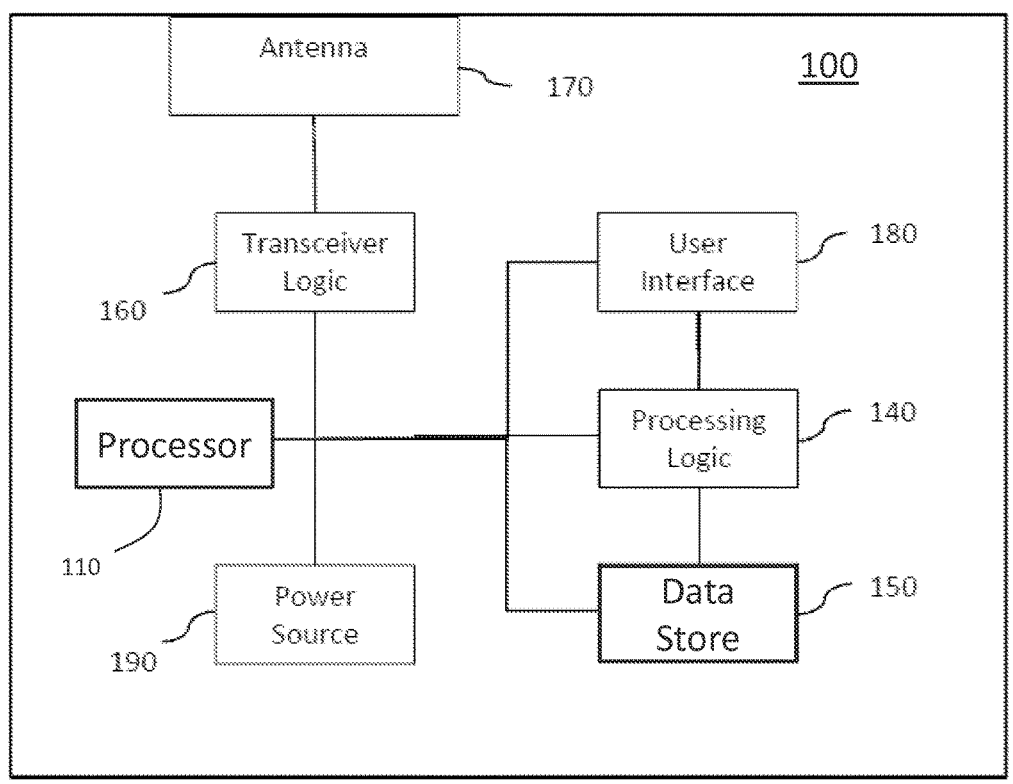
FIG. 2 is a block diagram illustrating exemplary components of an embodiment of a key device of FIG. 1.

With reference now to FIG. 2, a block diagram illustrates exemplary components of an embodiment of a key device 100 of FIG. 1. Key device 100 includes processing logic 140 and a processor 110 to execute the processing logic 140 stored on a computer-readable medium. The processing logic 140 is configured to control clocking, authentication, and communication activities. Of course, these activities may be divided or allocated among other application specific logics. As further discussed below, processing logic 140 obtains data from a data store 150. From the stored data, processing logic 140 forms a message, preferably in the form of "unlock advertising" for transceiver logic 160, stored on a computer-readable medium, to broadcast via antenna 170. Processing logic 140 may optionally provide an indication to a user through a user interface 180 of communications generally, or success or failure to access a controlled access device. The user interface 180 may be configured as a visual indicator such as an LED, an audible indication, a graphical indication or the like. The processor 110 may be powered from an internal power supply 190 such as a battery. The power supply 190 may be replaceable, rechargeable, or both.

In one embodiment, to preserve power supply 190, the processing logic 140 may be configured to place components of key device 100 in a stand-by or low power state and periodically "wake" needed components to perform needed activities such as authentication or communication.

In one embodiment, the key device 100 would be able to manage access for third-party controlled access devices 130 through software and hardware plug-ins. For example, software plug-ins may include a software development kit ("SDK") and/or an application programming interface ("API") that could be used on a third-party controlled access device to communicate with the key device 100. Exemplary hardware plug-ins, which include a piece of hardware developed to communicate with the key device 100, could be connected to a third-party controlled access device 130 as a way to grant access to features of their device. The hardware plug-in would send a current to the third-party controlled access device 130 when communicating with key device 100 and would send no current when communication breaks. For example, the hardware plug-in can authenticate with key device 100 and send an electrical signal to a wire or a pin when key device 100 is determined to be within a defined range. If the key device 100 is not within range, the plug-in would not send any signals to the pin. A third party controlled access device 130 interfaces with the hardware plug-in by connecting to the pin or wire. The third party controlled access device 130 is configured to unlock when an electrical signal is detected on the wire or pin and to lock when no electrical signal is detected. The reverse of this behavior could also occur if specified by the third-party. The communication would follow the schema of the algorithm described below.

Figure 3:
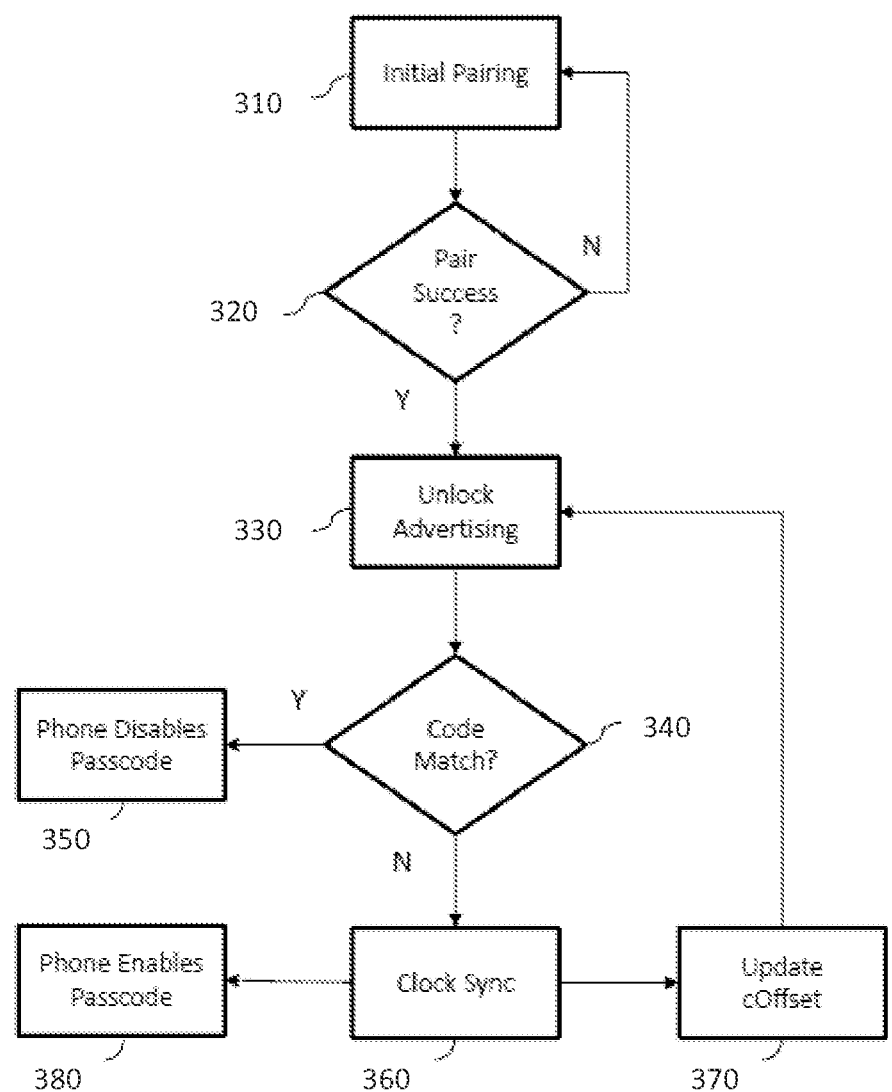
FIG. 3 is a flow diagram illustrating exemplary interactions between a key device and a controlled access device.

With reference now to FIG. 3, an example flow diagram of the interactions between a key device 100 and a controlled access device 130 is described. Initially, a key device 100 and a controlled access device 130 will pair 310 upon an initial encounter or after pairing data is lost between the two. The initial pairing 310 may include a user entering a code into an application or data entry field on the controlled access device 130. The controlled access device 130 may store the code in a computer-readable medium and calculate a key from the code using a formula. The controlled access device 130 may also store the calculated key. An initial pairing may additionally include a clock synchronization as described more fully below. Initial pairing is complete upon successful synchronization (if needed) and a matching code exchanged from the key device 100 to the controlled access device 130. Alternately, the initial pairing may include a code match from the controlled access device 130 to the key device 100 as well as a code match from the key device 100 to the controlled access device 130.

Upon successfully validating a request and pairing 320 with the controlled access device 130, the key device 100 will then periodically "advertise" its presence by broadcasting or advertising the code 330. When the controlled access device 130 receives the broadcast code, it may compare the received code to a stored code 340. The stored code may actually include several codes, for example, codes for a current time as well as codes for neighboring times, where neighboring times include those a few seconds to a few minutes on either side of current device time. If the received code matches the stored code, the controlled access device 130 disables its password or other access control and grants access 350. If the received code does not match the stored code, one problem may be that the respective clocks have drifted or been set too far apart. To check, the controlled access device 130 may synchronize 360 its clock with the clock of the key device 100. The clock synchronization may be accomplished by the controlled access device 130 generating a random number, encrypting the random number and sending it to the key device 100. The key device 100 may decrypt the random number and return it encrypted with clock data. The controlled access device 130 decrypts the number and clock data and checks the random number for continuity. If the random number correctly decrypts and matches the generated number, the device may update its offset based on the received clock data 370. Thereafter, the codes should match enabling access to the controlled access device 130. If the random number is not correctly decrypted, authentication fails and the controlled access device 130 ensures its password or other access controls are maintained or restored 380, and therefore the controlled access device 130 remains locked.

In operation and under normal conditions, the key device 100 and the controlled access device 130 operate without two-way communication. For example, once initial pairing is complete, whenever the key device 100 and controlled access device 130 are within signal proximity, the controlled access device 130 receives periodic unlock advertising from the key device 100, authenticates the code, and overrides or bypasses its password or access controls. The controlled access device 130 may permit continued use while continuing to receive the periodic advertising and may restore its access controls when the advertising is not received for a time.

Figure 4:
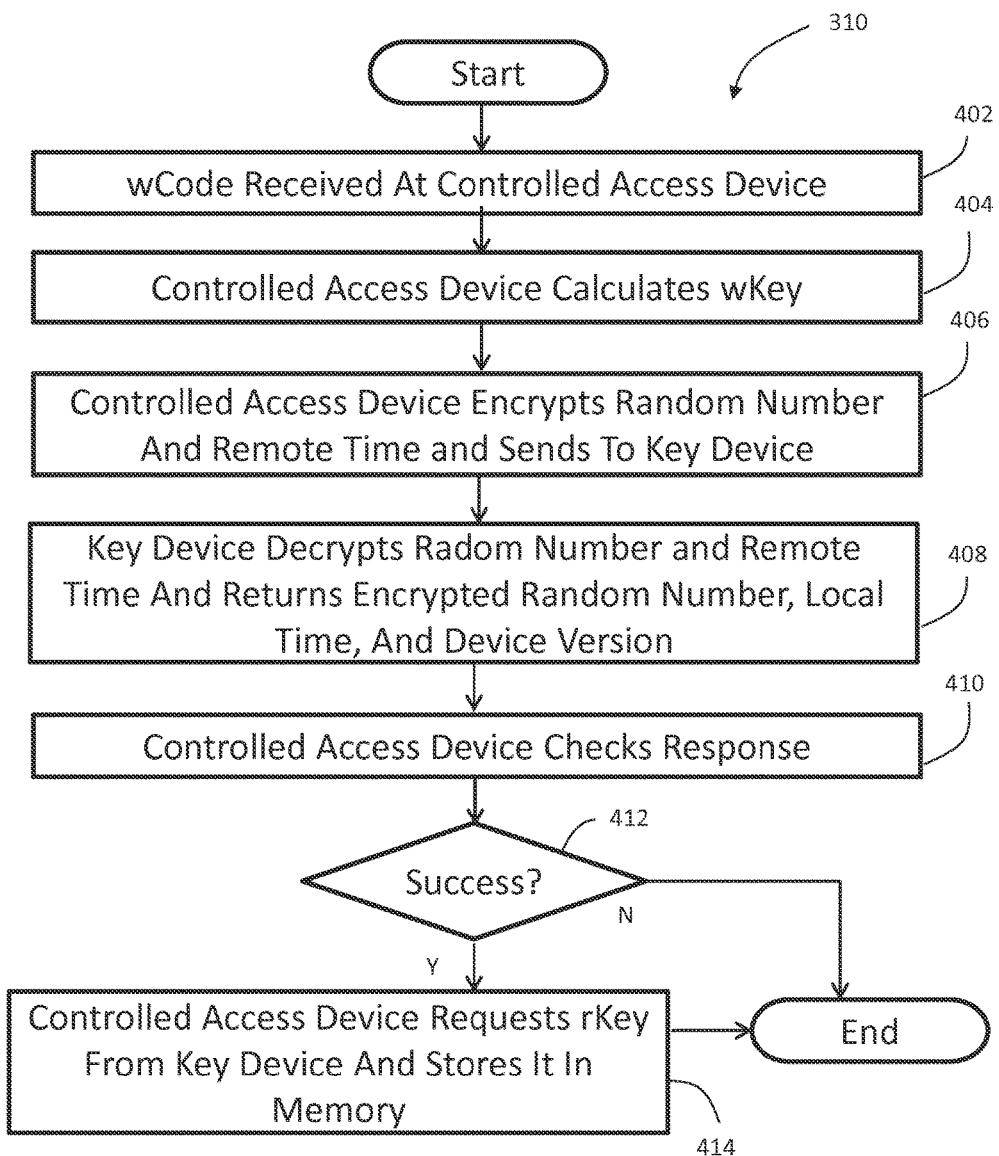
FIG. 4 is a flow diagram illustrating exemplary interactions between a key device and a controlled access device.
Figure 5:
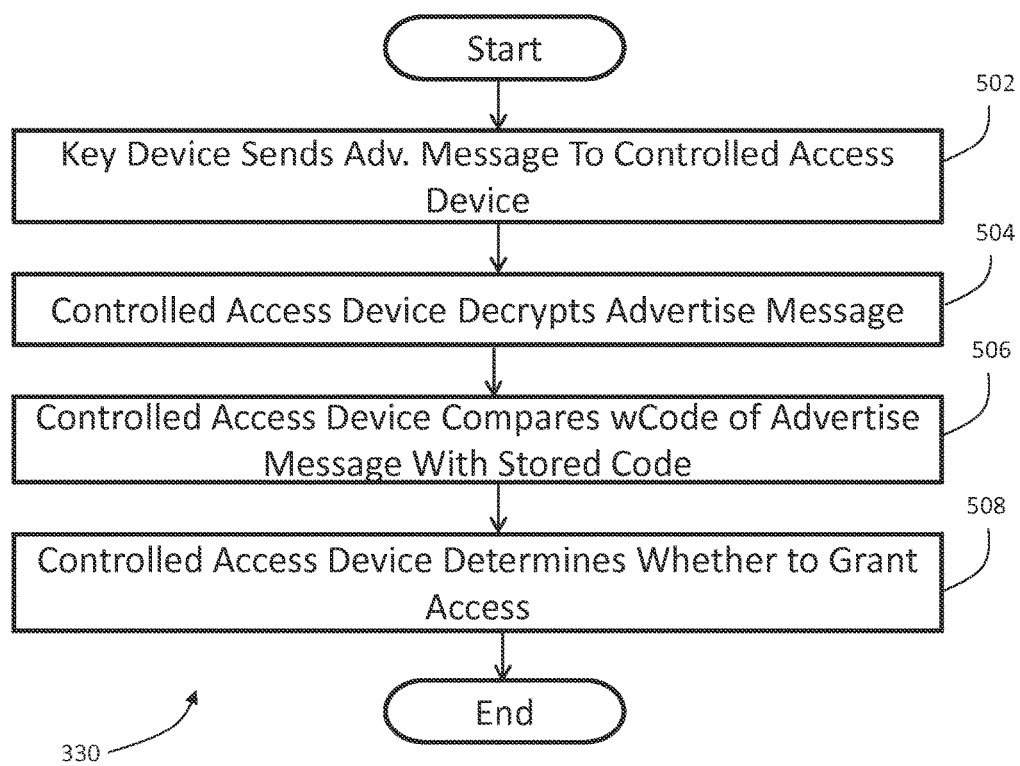
FIG. 5 is a flow diagram illustrating exemplary interactions between a key device and a controlled access device.

With reference now to FIGS. 4-5, variables "wCode", "wKey", "rKey", "storedTime", "Local Time", "Remote Time", "AdvMsg", "cOffset", "actOffset", and "wFormula" are introduced and are used as follows. "wCode" is deemed to include a code, for example, a code printed on the wristband or key device. "wKey" is defined as a symmetric encryption key generated by "wFormula." "rKey" is defined as a symmetric encryption key stored in memory of key device. "storedTime" is defined as the Local Time stored in memory of the key device. "Local Time" is defined as the actual date and time on the local device, either at the key device or the controlled access device. "Remote Time" is defined as the actual date and time on a device remote to the local device, which can be either the key device or the controlled access device. "AdvMsg", or Advertising Message is defined as "wCode" and key device "Local Time" encrypted with "rKey". "cOffset", or Expected Clock Offset, is defined as the expected offset between the key device clock and controlled access device clock. "actOffset", or Actual Clock Offset, is defined as the actual offset between the key device clock and controlled access device clock. "wFormula" is a formula that generates "wKey" from "wCode".

With reference now to FIG. 4, an example flow diagram of the steps of the initial pairing 310 between key device 100 and a controlled access device 130 is described. A user first obtains a wCode printed on, or otherwise obtained from or provided with, the key device 100 and provides the wCode to the controlled access device 130, 402. This can include entering the wCode into a software application being executed by the controlled access device 130, for example. The controlled access device 130 stores the wCode in memory. The controlled access device 130 then uses the stored wCode to generate or calculate a wKey using wFormula and stores the wKey in memory 404.

The controlled access device 130 then generates a random number and encrypts the random number, along with actual Local Time at the controlled access device 103, using the stored wKey and communicates the encrypted data to the key device 100, 406. The key device 100 decrypts the random number and the Remote Time, or the time at the controlled access device 103, 408. The key device 100 then encrypts the random number along with the Local time at the key device 100 and with a device version number, using the wKey, and responds by communicating the encrypted data back to controlled access device 130, 408.

The controlled access device 130 then decrypts and checks the response, 410. In particular, controlled access device 130 checks the random number and compares it to the initially sent random number. If it doesn't match, the controlled access device 130 notifies the user that the pairing has failed. Otherwise, the controlled access device 130 updates cOffset by determining the difference between the Remote Time, or the Local Time at the key device 100, and the Local Time at the controlled access device 130. The controlled access device 130 also checks device version to confirm that key device 100 is supported. Checking the version may include comparing the version number to a list of supported version numbers, for example. If the controlled access device 130 determines that the version number is not supported, the user is notified that the pairing failed. Otherwise, controlled access device 130 stores the version number.

If the controlled access device 130 determines that the key device 100 successfully responded, 412, meaning that the key device 100 returned a correct random number and that the version number of the key device 100 is supported, then the controlled access device 130 proceeds to request an rKey from key device 100, 414. The key device 130 encrypts the rKey using wKey and responds to the request, after which the controlled access device 130 decrypts and stores the rKey in memory, 414.

The controlled access device 130 then sends a message to key device 100 confirming successful pairing. In one example, a clock synchronization, as described above, is performed after an initial pairing if needed. Once pairing is complete, key device 100 may begin to advertise or broadcast a code to controlled access device 130.

With reference now to FIG. 5, an example flow diagram of the steps of the unlock advertising 330 between key device 100 and a controlled access device 130 is described. In one example, unlock advertising 330 occurs once every second but it should be appreciated that any suitable time interval may be used. The key device 100 first generates AdvMsg by encrypting wCode and Local Time at the key device 100 using the rKey and sends the AdvMsg to the controlled access device 130, 502. The controlled access device 130 receives and decrypts the AdvMsg, 504. The secured access device 130 then compares the wCode received in the AdvMsg with a stored wCode, 506. Based on the comparison, the controlled access device 130 then determines whether to grant access, 508. In particular, if the wCode in the received AdvMsg does not match the stored wCode, the controlled access device 130 is locked and access is not granted. If the codes do match, an actOffset is calculated using Local Time at the controlled access device 130 and the Remote Time, or the received Local Time at the key device 100. If the difference between actOffset and the stored cOffset is less than a predetermined value such as 3 seconds, for example, the controlled access device 130 is unlocked and access is granted. But if the difference between the actOffset and the stored cOffset is greater than or equal to the predetermined value, a clock synchronization is performed, as already described.

It should be appreciated that example system and method described can be applied for granting access to multiple devices simultaneously. In particular, upon receiving a valid AdvMsg, the controlled access device 130 grants access and does not respond to the key device 100. This method allows an unlimited number of controlled access devices 130 to receive the same AdvMsg and grant access simultaneously.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection," "connected," or "connectable" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See, Bryan A. Garner, A Dictionary of Modern Legal Usage 624 (2d. Ed. 1995).

The invention claimed is:

1. An authentication system, comprising:
an authentication device comprising at least one processor, at least one computer-readable medium, and program instructions stored on the at least one computer-readable medium for execution by the at least one processor, the program instructions comprising:
first program instructions to pair the authentication device with a plurality of controlled access devices upon an initial encounter with each of the plurality of controlled access devices, respectively, the pairing with a controlled access device of the plurality of controlled access devices comprising:
exchanging an encryption key with the controlled access device; and
communicating an initial value of a variable data to the controlled access device; and
second program instructions to periodically broadcast, at predetermined time intervals, identical advertisement data to the plurality of controlled access devices, the identical advertisement data being indicative of an authorization to grant access to all of the plurality of controlled access devices, wherein the identical advertisement data comprises the initial value of the variable data encrypted by the encryption key and wherein the identical advertisement data is updated at the predetermined time intervals with a next value of variable data; and
the controlled access device comprising at least one processor, at least one computer-readable medium, and program instructions stored on the at least one computer-readable medium for execution by the at least one processor, the program instructions comprising:
third program instructions to exchange an encryption key with the authentication device and receive from the authentication device and store the initial value of variable data;
fourth program instructions to receive the periodically broadcast advertisement data from the authentication device, subsequent to the initial encounter and pairing with the authentication device, and to compare the updated value of the variable data included in the received advertisement data with the initial value of the variable data;

fifth program instructions to automatically grant access to the controlled access device responsive to comparing the current value of the variable data included in the received advertisement data with the initial value of the variable data and to continue to allow access to the controlled access device while the controlled access device continues to periodically receive the broadcast advertisement data from the authentication device; and sixth program instructions to deny access to the controlled access device upon the controlled access device ceasing to receive the broadcast advertisement data from the authentication device.

2. The authentication system of claim 1, wherein the program instructions of the authentication device further comprise seventh program instructions to synchronize the process by which a value of the variable data is determined on the authentication device with the process by which a value of the variable data is determined on the controlled access device.

3. The authentication system of claim 2, wherein the seventh program instructions:

receive data indicative of a random number encrypted using the encryption key;

decrypt the random number;

encrypt the random number, in combination with an updated value of the variable data, using the encryption key; and wirelessly communicate the encrypted the random number, in combination with the updated value of the variable data, to the controlled access device.

4. The authentication system of claim 1, wherein the authentication device further comprises a user interface to communicate the status of access to the controlled access device.

5. The authentication system of claim 1, wherein the first program instructions communicate a version number of the authentication device to the controlled access device.

6. The authentication system of claim 1, wherein the variable data comprises deterministic changing data.

7. The authentication system of claim 6, wherein the deterministic changing data comprises time.

8. An authentication method comprising the steps of:

a computing device pairing with a controlled access device upon an initial encounter with the controlled access device, the pairing including:

exchanging an encryption key with the controlled access device; and communicating an initial value of a variable data to the controlled access device;

the computing device periodically broadcasting advertisement data indicative of an authorization to grant access to the controlled access device, the advertisement data being indicative of an authorization to grant access to any of a plurality of controlled access devices, wherein the advertisement data comprises the initial value of the variable data encrypted using the encryption key and wherein the variable data is updated at predetermined time intervals with a next value of variable data;

the controlled access device storing the initial value of variable data;

the controlled access device receiving the periodically broadcast advertisement data from the computing device, subsequent to the initial encounter and pairing with the computing device and comparing the updated value of the variable data included in the received advertisement data with the predicted value of the variable data;

the controlled access device automatically granting access, upon the controlled access device receiving advertisement data from the computing device subsequent to the initial encounter, responsive to comparing the received advertisement data and determining that a value of a variable data included in the received data matches a predicted value of the variable data, and continuing to allow access while the controlled access device continues to periodically receive the advertisement data from the computing device; and the controlled access device denying access upon ceasing to receive the advertisement data from the computing device.

9. The authentication method of claim 8, wherein the step of the computing device pairing with the controlled access device further comprises the steps of:

the computing device exchanging an encryption key with the controlled access device;

the computing device receiving encrypted data indicative of a random number from the controlled access device;

the computing device decrypting the random number from the controlled access device;

the computing device encrypting, using the encryption key, the random number in combination with a value of the variable data;

the computing device communicating the encrypted random number in combination with the value of the variable data to the controlled access device.

10. The authentication method of claim 8, wherein the step of the computing device broadcasting data indicative of an authorization to grant access to the controlled access device further comprises encrypting an access code using the encryption key and wirelessly communicating the encrypted access code to the controlled access device.

11. The authentication method of claim 10, further comprising the step of synchronizing the process by which access codes are determined between the computing device and the controlled access device.

12. The authentication method of claim 11, wherein the access code is the local time of the computing device, and the step of synchronizing local time of the computing device with local time of the controlled access device comprises:

receiving data indicative of a random number encrypted using the encryption key; decrypting the random number;

encrypting the random number, in combination with a local time of the computing device, using the encryption key; and wirelessly communicating the encrypted the random number, in combination with a local time of the computing device, to the controlled access device.

13. The authentication method of claim 8, wherein the step of the computing device pairing with the controlled access device further comprises the computing device communicating a version number of the computing device to the controlled access device.

14. The method of claim 8, wherein the variable data comprises deterministic changing data.

15. The method of claim 14, wherein the deterministic changing data comprises time.

* * * * *